US012155145B2

(12) United States Patent
Heller et al.

(10) Patent No.: US 12,155,145 B2

(45) Date of Patent: Nov. 26, 2024

(54) METHOD FOR PRODUCING AN ELECTRICAL CONNECTOR, IN PARTICULAR AN ELECTRICAL CONNECTOR FOR A HIGH-DENSITY HEADER SYSTEM; AS WELL AS AN ELECTRICAL CONNECTOR, IN PARTICULAR AN ELECTRICAL CONNECTOR FOR THE MOTOR VEHICLE INDUSTRY; AS WELL AS HIGH-DENSITY HEADER SYSTEM

(71) Applicant: TE Connectivity Germany GmbH, Bensheim (DE)

(72) Inventors: Christian Heller, Bensheim (DE); Martin Bleicher, Bensheim (DE); Martin Huber, Bensheim (DE); Steffen Spegel, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 651 days.

(21) Appl. No.: 17/115,324

(22) Filed: Dec. 8, 2020

(65) Prior Publication Data

US 2021/0091499 A1 Mar. 25, 2021

Related U.S. Application Data

(63) Continuation of application No. PCT/EP2019/065087, filed on Jun. 10, 2019.

(30) Foreign Application Priority Data

Jun. 12, 2018 (DE) ......................... 102018113980.2

(51) Int. Cl.
*H01R 13/41* (2006.01)
*H01R 13/52* (2006.01)
(Continued)

(52) U.S. Cl.
CPC ........... *H01R 13/41* (2013.01); *H01R 13/521* (2013.01); *H01R 43/005* (2013.01); *H01R 43/20* (2013.01)

(58) Field of Classification Search
CPC .............. H01R 9/0521; H01R 13/5205; H01R 13/2414; H01R 13/035; H01R 24/40; H01R 13/6583; H01R 13/5219
See application file for complete search history.

(56) References Cited

U.S. PATENT DOCUMENTS 5,141,444 A 8/1992 Redmond et al.
5,788,519 A 8/1998 Stern
(Continued)

FOREIGN PATENT DOCUMENTS

CN 106025681 A 10/2016
CN 106848732 A 6/2017
(Continued)

OTHER PUBLICATIONS

First Office Action from the CNIPA in Appln. No. 201980039459.3, dated Sep. 14, 2021 and English translation thereof, 19pp.
(Continued)

*Primary Examiner* — Abdullah A Riyami
*Assistant Examiner* — Nader J Alhawamdeh
(74) *Attorney, Agent, or Firm* — Barley Snyder

(57) ABSTRACT

An electrical connector includes a base body, a sealing mat arranged on a first surface of the base body, and a contact element. The contact element has a first contact region, a holding region, and a second contact region adjoining the holding region. The second contact region is inserted through the sealing mat into a receiving opening of the base body.

16 Claims, 2 Drawing Sheets

(51) Int. Cl.
*H01R 43/00* (2006.01)
*H01R 43/20* (2006.01)

(56) References Cited

U.S. PATENT DOCUMENTS

| | | | | |
|---|---|---|---|---|
| 6,361,341 | B1 | 3/2002 | Okayasu et al. | |
| 6,866,529 | B2 | 3/2005 | Hobson et al. | |
| 7,341,484 | B2 * | 3/2008 | Yamamoto | H01R 13/5202 439/271 |
| 7,722,413 | B2 | 5/2010 | Tonosaki | |
| 8,292,639 | B2 * | 10/2012 | Achammer | H01R 13/5216 439/949 |
| 8,764,475 | B2 * | 7/2014 | Maher | H01R 13/5216 439/391 |
| 8,962,999 | B2 * | 2/2015 | John | H01R 12/7023 338/50 |
| 9,728,928 | B2 | 8/2017 | Yoshigi | |
| 10,027,051 | B1 * | 7/2018 | Manushi | H01R 43/18 |
| 10,411,392 | B2 * | 9/2019 | Manushi | H01R 43/18 |
| 10,439,317 | B2 * | 10/2019 | Horchler | H01R 12/79 |
| 2002/0102874 | A1 * | 8/2002 | Hobson | H01R 13/521 439/271 |
| 2007/0270001 | A1 * | 11/2007 | Matsumura | H05K 3/284 439/82 |
| 2016/0141793 | A1 | 5/2016 | Osada et al. | |
| 2017/0294737 | A1 * | 10/2017 | Horchler | H01R 12/716 |
| 2018/0277985 | A1 | 9/2018 | Tsai | |
| 2018/0294594 | A1 * | 10/2018 | Manushi | H01R 13/5202 |

FOREIGN PATENT DOCUMENTS

| | | | |
|---|---|---|---|
| DE | 295 10 247 | U1 | 10/1995 |
| DE | 693 19 822 | T2 | 12/1998 |
| DE | 101 42 195 | A1 | 4/2003 |
| DE | 10 2004 062 003 | A1 | 7/2006 |
| DE | 10 2011 080 347 | A1 | 2/2013 |
| EP | 0128472 | A2 | 12/1984 |
| EP | 0299797 | A2 | 1/1989 |
| EP | 0592102 | A2 | 4/1994 |
| EP | 0848462 | A2 | 11/1997 |
| EP | 1344283 | B1 | 2/2008 |
| GB | 931657 | | 7/1963 |
| GB | 2295733 | A | 6/1996 |
| JP | S60007084 | A | 1/1985 |
| JP | S6463282 | A | 3/1989 |
| JP | H1272061 | A | 10/1989 |
| JP | H4294074 | A | 10/1992 |
| JP | H9245880 | A | 9/1997 |
| JP | 2000348817 | A | 12/2000 |
| JP | 2002134218 | A | 5/2002 |
| JP | 2002195413 | A | 7/2002 |
| JP | 2007103045 | A | 4/2007 |
| JP | 2008505465 | A | 2/2008 |
| JP | 2009117064 | A | 5/2009 |
| JP | 2009181798 | A | 8/2009 |
| JP | 2009543299 | A | 12/2009 |
| JP | 2014032785 | A | 2/2014 |
| JP | 2015022922 | A | 2/2015 |
| JP | 20155132013 | W | 7/2015 |
| JP | 2015210937 | A | 11/2015 |
| JP | 2016189277 | A | 11/2016 |
| WO | 2006002803 | A1 | 1/2006 |
| WO | 2009096367 | A1 | 8/2009 |

OTHER PUBLICATIONS

Chinese Office Action and English translation thereof corres. to Application No. 201980039459.3, Dated: Mar. 22, 2022, 14 pp.
German Office Action, dated Mar. 12, 2019, 8 pages.
German Office Action, dated Jun. 18, 2019, 8 pages.
PCT Notification, The International Search Report and the Written Opinion of the International Searching Authority, dated Aug. 6, 2019, 16 pages.
Abstract of DE 10 2004 062 003, dated Jul. 13, 2006, 1 page.
Abstract of DE 10 2011 080 347, dated Feb. 7, 2013, 1 page.
Abstract of DE 101 142 195, dated Apr. 24, 2003, 1 page.
Examination Report from the Indian Patent Office dated Sep. 15, 2022 corresponding to Application No. 202047053507, 6 pages.
Extended European Search Report dated Sep. 15, 2022 corresponding to Application No. 19 729 544.7-1201, 7 pages.
Office Action from the CNIPA dated Nov. 7, 2022 corresponding to Application No. 201980039459.3, and English translation thereof, 11 pages.
Chinese Office Action dated Jul. 25, 2023 with English translation, corresponding to Application No. 201980039459.3, 15 pages.
Japanese Office Action dated Aug. 22, 2023 with English translation, corresponding to Application No. 2020-568512, 22 pages.
Office Action from the Japanese Patent Office dated Feb. 28, 2023 (with English Translation thereof), corresponding to Application No. 2020-568512,19 pages.
Korean Office Action dated Dec. 15, 2023 with English translation, corresponding to Application No. 10-2021-7000696, 12 pages.

* cited by examiner

METHOD FOR PRODUCING AN ELECTRICAL CONNECTOR, IN PARTICULAR AN ELECTRICAL CONNECTOR FOR A HIGH-DENSITY HEADER SYSTEM; AS WELL AS AN ELECTRICAL CONNECTOR, IN PARTICULAR AN ELECTRICAL CONNECTOR FOR THE MOTOR VEHICLE INDUSTRY; AS WELL AS HIGH-DENSITY HEADER SYSTEM

CROSS-REFERENCE TO RELATED APPLICATIONS

This application is a continuation of PCT International Application No. PCT/EP2019/065087, filed on Jun. 10, 2019, which claims priority under 35 U.S.C. § 119 to German Patent Application No. 102018113980.2, filed on Jun. 12, 2018.

FIELD OF THE INVENTION

The present invention relates to an electrical connector and, more particularly, to an electrical connector for a high-density header system.

BACKGROUND

In the electrical industry (electronics, electrical engineering, electrical equipment, electrical power engineering, etc.), a large number of electrical connectors, socket, pin and/or hybrid connectors, etc.—designated below as (electrical) connectors (also: mating connectors)—are known, which serve to transmit electric currents, voltages, signals and/or data with a wide range of currents, voltages, frequencies and/or data rates.

In the low, medium or high voltage and/or current range, and in particular in the automotive industry, such connectors must guarantee, at short notice, a transmission of electrical power, signals and/or data, in warm, possibly hot, contaminated, humid and/or chemically aggressive environments, permanently, repeatedly and/or after a comparatively long period of inactivity. Due to a wide range of applications, a large number of specially configured connectors is known.

Such a connector, and possibly its associated or parent housing, can be installed on an electrical cable, a wire, a cable harness, etc., or at/in an electrical device or apparatus such as for example at/in a housing, at/on a leadframe, at/on a printed circuit board, etc. of a (power-) electrical, electro-optical or electronic component or a corresponding assembly, etc.

If a connector (with/without housing) is located on a cable, a wire or a cable harness, this is also known as a (flying) (plug) connector or a plug or a coupling; if it is located at/in an electrical, electro-optical or electronic component, assembly etc, then this is also known as a (mating) connector device, such as, for example, a (built-in) connector, a (built-in) plug or a (built-in) socket. Furthermore, a connector at such a device is often also referred to as a (plug) receptacle, pin tray, pin strip or header.

Such a connector has to guarantee faultless transmission of electricity, wherein connectors (connectors and mating connectors) which correspond to one another and are partly complementary to one another usually have fixing and/or locking devices for permanently, but generally releasably, fixing and/or locking the connector to/in the mating connector or vice versa.

Constant efforts are being made to improve electrical connector devices or connectors, in particular to make them more robust and to make them less expensive to form and/or to produce.

Electrical connectors with contact elements are known from the prior art, which electrical connectors are arranged in an electrically insulated manner in a contact chamber, for example in the cylinder-head wall. By way of an O-ring, which is mounted in a corresponding seating between the contact chamber and the contact element, the contact chamber is sealed so that no fluid can escape. On both sides of the divider wall, an electrical conductor is in each case joined to the contact section of the contact pin, so that an electrical signal can be transmitted via the contact pin.

In this way, even though an egress of oil or other fluids through the contact chamber is effectively prevented, in modern assemblies, such as internal combustion engines or gear mechanisms for example, the number of signals to be transmitted has increased significantly. Thus, an increasing number of sensors is used within the assemblies or mechanical valve gears are replaced by electromagnetic ones. Since a contact pin is required for each signal which is to be transmitted and often only a small area is available for attaching the plug connector, the spacing of the contact chambers has to be reduced in size more and more. Up until now, in the prior art this problem has been solved by making as small a grid as possible between the contact pins, whereby both the spacings between the contact chambers and the diameters of the contact elements have been reduced in size. As a result, many and also very small O-rings have to be used for sealing the contact elements on the electrical connector, the mounting of which is difficult and time-consuming.

Furthermore, electrical connectors are known which essentially consist of a dielectric base body, which is usually provided with a multiplicity of receiving openings which are suitable for receiving electrically conductive contact elements. The electrically conductive contact elements are provided for connecting electronic structural parts. The base body is produced, for example, from a polymer material or epoxy resins, since these materials have advantageous mechanical properties and have good chemical and heat resistance. Furthermore, the base body substantially serves to hold and align the contact elements, and it provides means for a mechanical coupling with other electrical components.

The electrical contact elements consist, for example, of a solid wire cord, one end of which is connected, for example, to a printed circuit board or a mating piece connector and the other end of which is connected, for example, to an electronic appliance. In this case, the contact elements are inserted into the provided receiving openings of the base body and are held and aligned on the latter, for example by a press fit, in such a way that a reliable mechanical connection is produced.

Depending on the application of the electrical connector, it is sometimes necessary to encapsulate the arrangement of the contact elements at the base body, in order to guarantee a liquid-tight connection, for example. This is the case in particular with motor-vehicle applications, in which electrical connectors are frequently used in the engine compartment, in order to connect the various electronic appliances in a vehicle. In the art, this was usually achieved by a method which is known as "potting". Potting means an operation of filling an assembled electrical connector. In this case, the contact elements, after they have been inserted into their respective receiving opening of the base body, are provided with a liquid sealant. In this case, the liquid sealant flows into various gaps or openings and seals the contact elements and the base body.

It proves to be disadvantageous that the “potting” method on the one hand is expensive, and on the other hand is also very time-consuming. The curing of the resin is often protracted, and moreover it can result in undesired changes to outer surfaces of the base body, as a result of which a manual reworking may become necessary, which is likewise time-consuming and costly. The quality of a seal which is produced by potting is furthermore dependent on the shape of the cast parts and the materials used, since some sealing potting compounds function better with certain base body materials than others. Moreover, potting places strict requirements on safety in the workplace, and can lead to environmental problems. Furthermore, it requires significant investment for the equipment which is required for the distribution and handling of adhesive materials.

SUMMARY

An electrical connector includes a base body, a sealing mat arranged on a first surface of the base body, and a contact element. The contact element has a first contact region, a holding region, and a second contact region adjoining the holding region. The second contact region is inserted through the sealing mat into a receiving opening of the base body.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
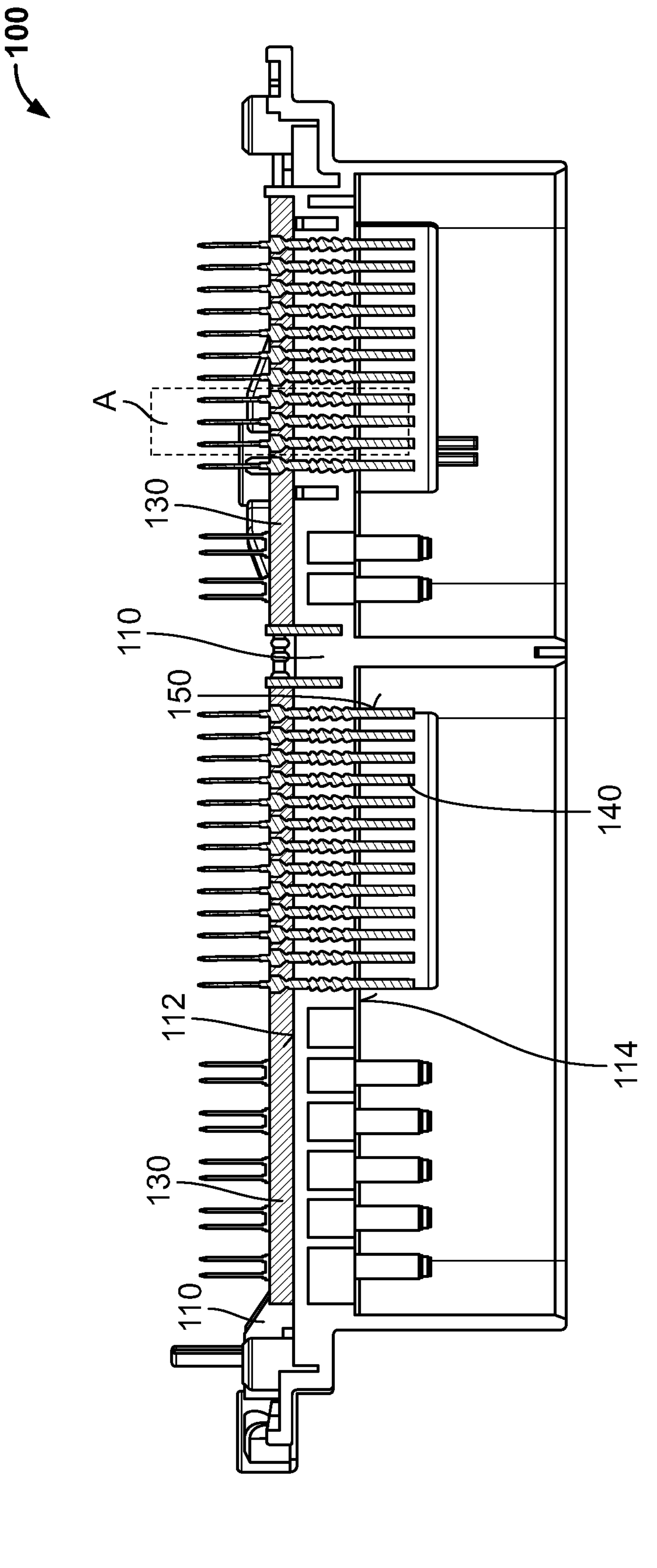
FIG. 1 is a sectional side view of an electrical connector according to an embodiment.

The invention is explained in greater detail below using an exemplary embodiment with reference to the attached schematic drawings, which are not true to scale. Sections, elements, structural parts, units, diagrams and/or components which possess an identical, univocal or similar design and/or function are identified by the same reference symbols. A possible alternative, a steady-state and/or kinematic reversal, a combination, etc., which is not explained, is not depicted in the drawings and/or is not exclusive, with respect to the exemplary embodiments of the invention or a component, a scheme, a unit, a structural part, an element or a section thereof can be further derived.

In the case of the invention, a feature (section, element, structural part, unit, component, function, size etc.) can be configured positively, i.e. present, or negatively, i.e. absent, a negative feature not being explained explicitly as a feature if, according to the invention, no importance is placed on the fact that it is absent, therefore the invention actually made consists in omitting that feature. A feature of this specification can be applied not only in a specified manner, but rather can also be applied in another manner (isolation, summary, replacement, addition, uniqueness, omission etc.). In particular, by using a reference symbol and a feature associated with this, or vice versa, it is possible to replace, add or omit a feature in the claims and/or the description. Moreover, as a result, a feature can be explained and/or specified in greater detail in a claim.

The features of this description can (considering the (mostly unknown) prior art) also be interpreted as optional features; i.e. every feature can be understood as an optional feature, i.e. as a non-binding feature. It is thus possible to detach a feature, possibly including its periphery, from an exemplary embodiment, this feature then being transferable to a generalized inventive concept. The lack of a feature (negative feature) in an exemplary embodiment shows that the feature is optional in relation to the invention. Furthermore, in the case of a type term for a feature, a generic term for the feature can also be read alongside this (possibly further hierarchical division into subgenus etc.), as a result of which, for example taking equivalent effect and/or equivalence into account, a generalization of a, or this, feature is possible.

The invention is explained in greater detail below using an exemplary embodiment of an electrical connector 100. Although the invention is described and illustrated more closely and in greater detail by way of an exemplary embodiment, in this way the invention is not limited by this disclosed exemplary embodiment, rather it is of a fundamental nature. Other variations can be derived from this without departing from the scope of protection of the invention. Thus, the invention is also applicable to other electrical connectors in the motor vehicle industry or in a non-motor vehicle industry, such as a fluid engineering or electrical engineering industry, and very generally in engineering.

In the drawings, only those spatial sections of a subject-matter of the invention which are necessary for an understanding of the invention are depicted. Names such as connector and mating connector, connecting device and mating connecting device etc. are to be interpreted synonymously, i.e. in each case optionally mutually interchangeable.

FIG. 1 is a schematic, partially sectional view of an exemplary electrical connector 100, which is formed in the present case as a header 100. The electrical connector 100 has a base body 110, which is provided with a plurality of receiving openings 150, which extend from a first surface 112 of the base body 110 in the direction of a second surface 114 of the base body 110. The electrical connector 100 has a plurality of different types of contact elements 140, which are inserted into the receiving openings 150 of the base body 110. In an embodiment, the receiving opening 150 is a blind hole pre-molded in the base body 110.

In an embodiment, the electrical connector 100 is for a high-density header system and produces a plug connection with a corresponding mating connector. In various embodiments, the electrical connector 100 can be formed as a plug connector, a built-in connector, a housing connector or as a flying plug connector for a cable. The connector 100 is applicable, for example, for a serial communication system, a networking or interconnecting of sensors, actuators etc., for an ambient lighting (room lighting, passenger compartment lighting), within a door, within a seat etc. of a motor vehicle etc.

As shown in FIG. 1, a sealing mat 130 is arranged abutting against the first surface 112 of the base body 110, in a region which borders the receiving openings 150. The sealing mat 130, in an embodiment, is made from an elastomer. The sealing mat 130, before being pierced by the contact elements 140, has a continuous surface in a region which borders the receiving openings 150 of the base body 110. As a result of this, during the piercing by the at least one contact element 140, a particularly intimate, sealed connection is obtained. Moreover, this procedure is minimally time-consuming and makes potting compound, as is required in the prior art, unnecessary. In an embodiment, the sealing mat 130 can protrude into the receiving opening 150 at least in regions.

Alternatively, before the insertion of the contact elements 140, the sealing mat 130 can be pre-punched in the region which borders the receiving openings 150 of the base body 110, a respective diameter of the pre-punched hole being smaller than a respective diameter of the contact element 140 which is to be pierced in this region, this not being depicted in detail in the illustrated figures.

Figure 2:
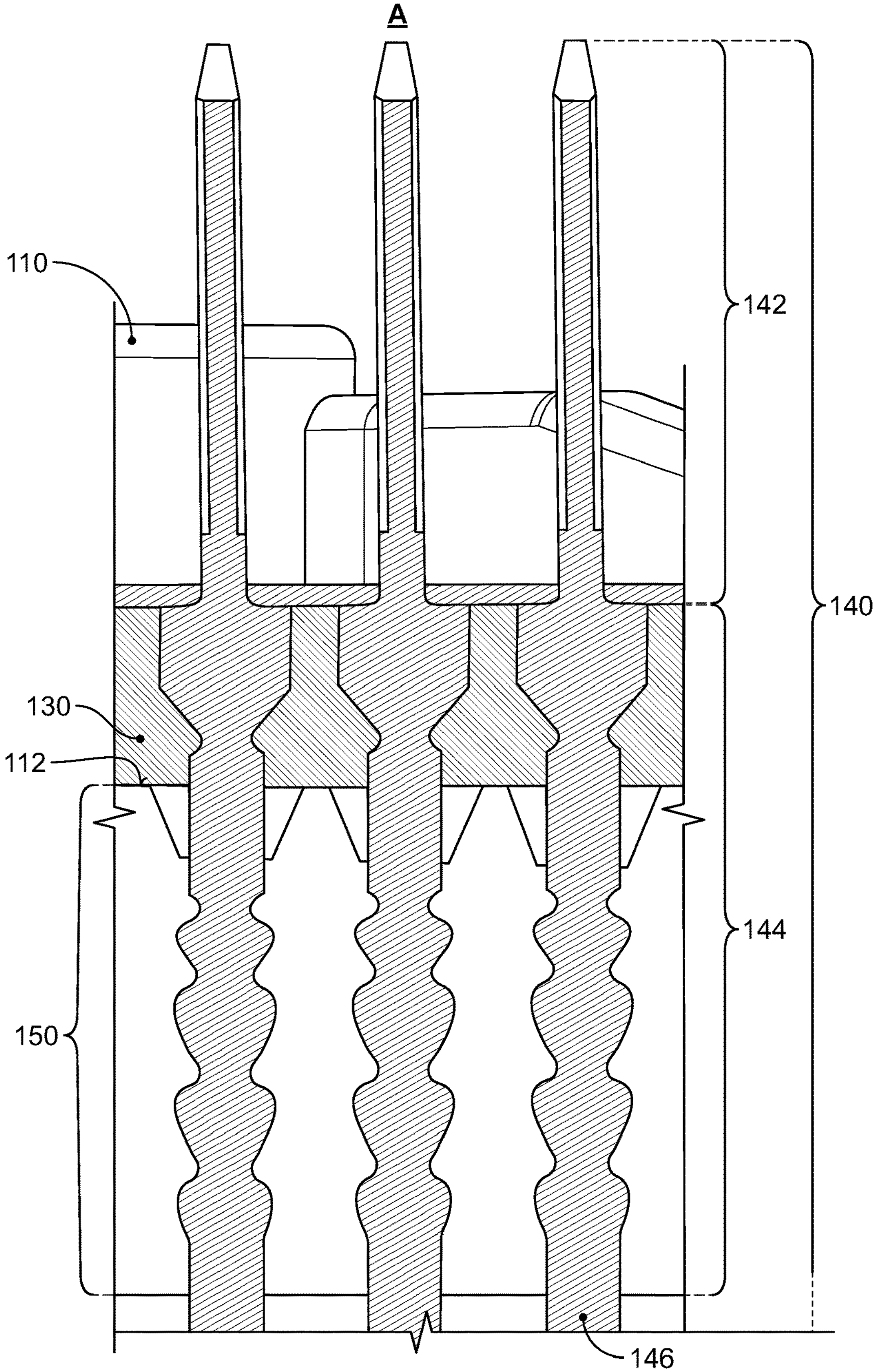
FIG. 2 is a detail view of a portion A of FIG. 1.

As the detailed view of the cutout A from FIG. 1 illustrated in FIG. 2 shows, the contact elements 140 each have a first contact region 142, a holding region 144 and a second contact region 146 adjoining the holding region 144. In the depicted exemplary embodiment, the contact elements 140 are provided with a harpoon-like holding region 144, by way of example. In this way, starting from the first surface 112 of the base body 110 with the second contact region 146, a contact element 140 can be inserted through the sealing mat 130 into the respective corresponding receiving opening 150 of the base body 110, the sealing mat 130 enclosing the holding region 144 of the contact elements 140 in the depicted inserted state, at least in regions, and protruding into the receiving openings 150 of the base body 110.

A method for producing the electrical connector 100 includes providing the base body 110, providing the sealing mat 130 abutting against the first surface 112 of the base body 110, and providing at least one contact element 140. The method includes piercing the sealing mat 130 with the contact element 140. The second contact region 146 is inserted through the sealing mat 130, from a side opposite the base body 110, into at least one corresponding receiving opening 150 of the base body 110 until the second contact region 146 is fixed in the receiving opening 150 of the base body 110 in a desired final position.

By the insertion of the contact element 140 between the sealing mat 130 and the base body 110, a compression is effected between the sealing mat 130 and the base body 110 which obtains a seal between the base body 110 and the contact element 140. By the insertion of the contact elements 140 between the sealing mat 130 and the base body 110, a regionally plastic deformation of the sealing mat 130 in the region of the receiving openings 150 of the base body 110 can take place, which in turn improves the seal between the base body 110 and the contact elements 140.

Thus, by way of the sealing mat 130, the first surface 112 of the base body 110 is sealed effectively against various types of leakage with respect to the second surface 114 of the base body 110, despite the contact elements 140 inserted into the receiving openings 150. The method is uncomplicated and rapid, makes potting compound unnecessary, and effects a reliable seating of the contact elements 140 in the base body 110.

Besides the described and illustrated exemplary embodiments, further embodiments are conceivable which can comprise further variations and combinations of features. For example, in an embodiment, the electrical connector 100 can have a plurality of sealing mats 130 for a plurality of contact elements 140.

What is claimed is:

1. A method for producing an electrical connector, comprising:

providing a base body;

providing a sealing mat abutting against a first surface of the base body;

providing a contact element having a first contact region, a holding region, and a second contact region adjoining the holding region; and piercing the sealing mat with the contact element, the second contact region is inserted through the sealing mat from a side opposite the base body into a receiving opening of the base body until the second contact region is fixed in the receiving opening, the sealing mat extends into the receiving opening of the base body along the holding region of the contact element.

2. The method of claim 1, wherein the sealing mat, before being pierced by the contact element, has a continuous surface in a region of the sealing mat that borders the receiving opening.

3. The method of claim 1, wherein the sealing mat, before being pierced by the contact element, is pre-punched in a region of the sealing mat that borders the receiving opening.

4. The method of claim 3, wherein a diameter of a pre-punched hole in the sealing mat is smaller than a diameter of the contact element.

5. The method of claim 1, wherein the sealing mat at least in part encloses the holding region of the contact element due to the piercing.

6. The method of claim 1, wherein the contact element effects a compression between the sealing mat and the base body to form a seal between the base body and the contact element.

7. The method of claim 1, wherein the sealing mat plastically deforms in a region of the receiving opening.

8. An electrical connector, comprising:

a base body;

a sealing mat arranged on a first surface of the base body; and a contact element having a first contact region, a holding region, and a second contact region adjoining the holding region, the second contact region is inserted through the sealing mat into a receiving opening of the base body, the sealing mat extends into the receiving opening of the base body along the holding region of the contact element.

9. The electrical connector of claim 8, wherein the receiving opening is a blind hole pre-molded in the base body.

10. The electrical connector of claim 8, wherein the sealing mat is an elastomer.

11. The electrical connector of claim 8, wherein the contact element is one of a plurality of contact elements.

12. The electrical connector of claim 8, wherein the sealing mat is one of a plurality of sealing mats.

13. The electrical connector of claim 8, wherein the electrical connector is a plug connector, a built-in connector, a housing connector, or a flying plug connector for a cable.

14. The electrical connector of claim 8, wherein the electrical connector is for the motor vehicle industry.

15. The electrical connector of claim 8, wherein the electrical connector produces a plug connection with a corresponding mating connector.

16. A header system, comprising:

an electrical connector including a base body, a sealing mat arranged on a first surface of the base body, and a contact element having a first contact region, a holding region, and a second contact region adjoining the holding region, the second contact region is inserted through the sealing mat into a receiving opening of the base body, the sealing mat extends into the receiving opening of the base body along the holding region of the contact element.

* * * * *